Jan. 3, 1967 R. R. RICHARD 3,295,377

ANGULAR ACCELEROMETER

Filed June 13, 1966 2 Sheets-Sheet 1

Richard R. Richard
INVENTOR

BY *G. H. McCoy*
*M. J. Marnock*
ATTORNEYS

Jan. 3, 1967  R. R. RICHARD  3,295,377
ANGULAR ACCELEROMETER
Filed June 13, 1966  2 Sheets-Sheet 2
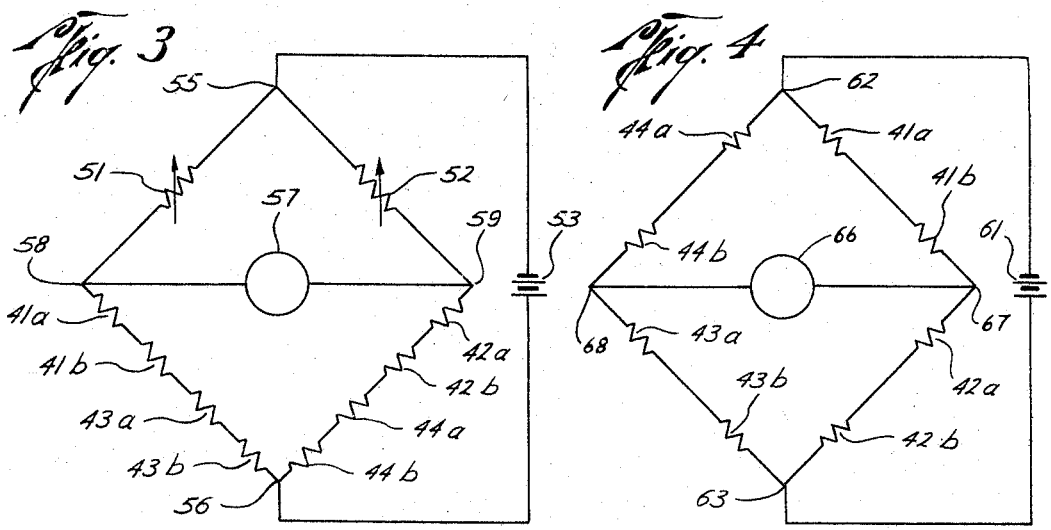
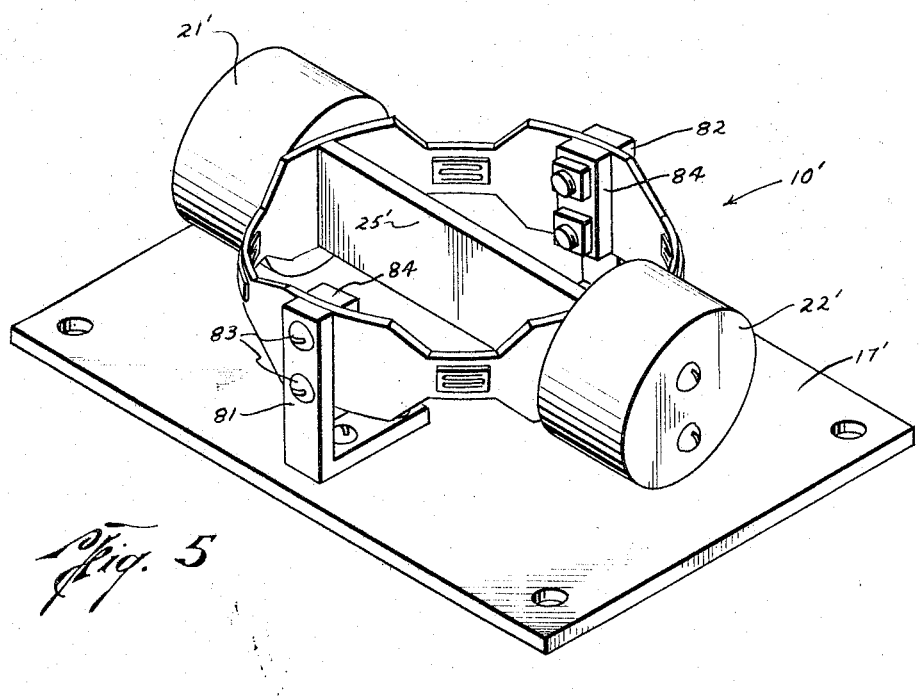
Richard R. Richard
INVENTOR
BY
ATTORNEYS

United States Patent Office 3,295,377
Patented Jan. 3, 1967

3,295,377
ANGULAR ACCELEROMETER
Richard R. Richard, Houston, Tex., assignor to the United States of America as represented by the Administrator of the National Aeronautics and Space Administration
Filed June 13, 1966, Ser. No. 557,868
8 Claims. (Cl. 73—517)

The invention described herein was made by an employee of the United States Government and may be manufactured and used by or for the Government for governmental purposes without the payment of any royalties thereon or therefor.

This invention relates to accelerometers, and more particularly to an accelerometer for measuring angular accelerations.

In the guidance and control systems of spacecraft and missiles it is particularly important and desirable that angular accelerations be measured with extreme precision. While a variety of angular accelerometers have heretofore been devised, they are generally undesirable for use in harsh environments since their operation in adversely affected by large temperature variations and vibrations which induce unwanted signals.

In one method which has heretofore been used for measurement of angular acceleration, two accelerometers of the type having a linear sensitive axis, and normally responsive to linear acceleration, are disposed with their sensitive axes parallel. The two linear accelerometers are electrically connected and so oriented that their outputs are additive for angular accelerations, but are cancellative for linear accelerations. In this arrangement, however, the geometry is critical, and extreme caution must be taken to assure equal sensitivities in the accelerometers. The arrangement is vexed by structural flexure problems and vibrations which may be induced in the two linear accelerometers are usually nonuniform, thus complicating the problem of nulifying vibrational effects. Furthermore, the accelerometer pair is generally sensitive to an angular velocity about an arbitrary axis lying in or parallel to the plane of the sensitive axes.

Another apparatus which has been used for measuring angular acceleration comprises a metal arm which is pivoted at its center point and provided at each end with a mass connected thereto. Angular acceleration tends to cause rotation of the arm about its pivotal axis. This motion is sensed by electronic means which supplies an input to a servo system adapted to provide a proportional restoring torque. A measurement of the current supplied to the torque motor of the system provides a signal proportional to the angular acceleration. In this type of servo-controlled apparatus, frequency response is often sacrificed, and the associated electronic circuitry is complex. Also, the nature of the sensing element requires difficult and tedious manufacturing processes.

Another apparatus which has been used for measuring angular acceleration comprises a continuous circular tube of fluid with a paddle disposed within the fluid. Angular acceleration causes the fluid to displace relative to the container wall, and thus induces a paddle movement which is converted to an electrical output signal proportional in magnitude to the acceleration. Construction tolerances are critical in this type of apparatus, however, and for many applications the device is objectionably heavy and large. Furthermore, vibrational effects and complications resulting from zero gravity environment limit its desirability for aerospace applications.

The angular accelerometer of this invention, which has been devised to overcome attendant disadvantages in the prior art devices, is of relatively lightweight rugged construction with uncomplicated measuring circuitry. The invention comprises a sensing ring with a pair of masses supported on the ring in diametrically opposed locations. The masses are joined by a rigid connecting rod which is also fixed to the ring at these locations. The ring is secured at diametrically opposed points to a rigid support means which is fixed to the body to be subjected to angular accelerations. Preferably, the points of support for the sensing ring are disposed in a ninety degree relationship to the rod which joins the masses.

The sensing ring is also provided with strain intensification areas in four locations which are equiangularly disposed about the ring. The strain intensification areas are produced by notches in the ring which reduce the cross-sectional area of the ring at four locations. The arrangement is such that a strain intensification area is located between each mass and point of connection of the ring and support member. At each strain intensification area a strain gauge is bonded to the sensing ring on its external surface, and a corresponding strain gauge is attached on its inner surface so that the strain gauges are arranged in diametrically opposed pairs. The gauges are electrically connected in a bridge circuit arrangement which becomes unbalanced by variations in the electrical resistances of the gauges when they are subjected to tension or compression forces. In the event of an angular acceleration, the inertia of the ring-supported masses results in the transmission of forces along the sensing ring and subjection of each of the several gauges to either tension or compression forces, with a consequent imbalance of the bridge circuit proportionate to the magnitude of angular acceleration.

Although the accelerometer of this invention is operational with only the external strain gauges, the strain gauges located on the inner surface of the ring enhance the over-all sensitivity of the device since they serve to cancel vibrations in the sensing ring and any forces other than those yielding angular acceleration data which may be applied to the ring. The rigid rod which joins the masses on the sensing ring also tends to insure uniformity in vibrations which may be induced in opposing halves of the sensing ring so that compensation of vibrational effects is greatly simplified. In addition, the arcuate configuration of the sensing ring increases the strength of the mass supporting means and is less subject to vibration than elongate linear structures.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 3 is a schematic diagram of a simple measuring circuit of the invention;

FIG. 4 is a schematic diagram of an alternative form of the measuring circuit for the invention; and FIG. 5 is a perspective view of an alternative arrangement of the mechanical features of the invention.

Figure 1:
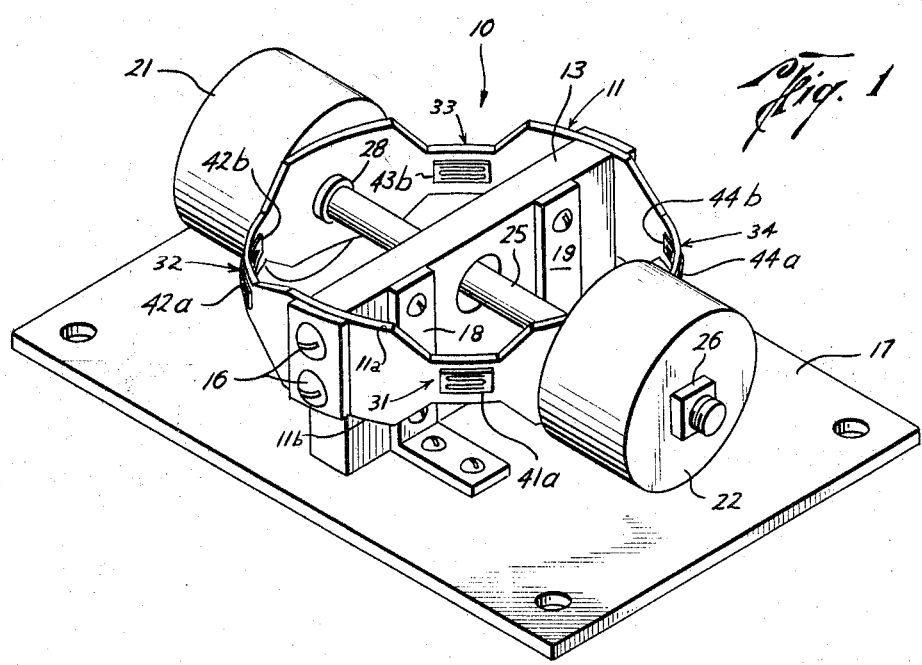
FIG. 1 is a perspective view which illustrates the mechanical features of a preferred arrangement of the invention.
Figure 2:
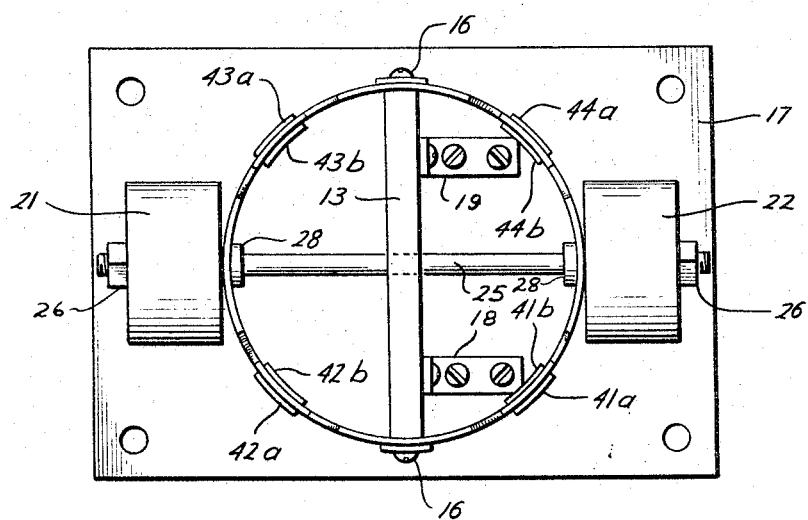
FIG. 2 is a top planar view of the apparatus shown in FIG. 1.

Referring more particularly to the drawings, there is shown in FIG. 1 an angular accelerometer 10 which constitutes a preferred embodiment of the invention. The accelerometer 10 comprises an annular sensing ring 11 of aluminum which is carried by a diametrically disposed support member 13, also of aluminum. The sensing ring in the form of a circular cylinder is bolted to the ends of the support member 13 by bolts 16, and carried thereby a uniform distance above a base plate 17 to which the support member is secured by L-shaped braces 18, 19.

The base plate 17 is adapted to be bolted to the body or vehicle which is to be subjected to angular accelerations.

Supported on the ring in diametrically opposed locations thereon are a pair of masses 21, 22 in the form of steel disks. The masses 21, 22 are threaded on the ends of an aluminum connecting rod 25 which extends through an opening provided in the support member 13 and through openings provided in the sensing ring for this purpose. The steel disks are held clamped against the external surface of the sensing ring by nuts 26 on the threaded ends of the rod 25. In addition, clamping nuts 28 are disposed internally of the ring on the rod 25 and clamp against the inner surface of the ring. The nuts 28 are provided with curved faces which conformingly engage the curved surface of the ring so as to provide uniform clamping surfaces.

The edges 11a and 11b of the cylindrical sensing ring are each notched at four locations equiangularly disposed about the ring to provide strain intensification areas 31, 32, 33, and 34, as best shown in FIG. 1. The arrangement is such that a strain intensification area is located between each mass 21, 22 and point of connection of the ring and support member. At each strain intensification area a strain gauge is bonded to the sensing ring on its external surface, and a corresponding strain gauge is attached on its internal surface. The ring is, therefore, provided with external strain gauges 41a, 42a, 43a, and 44a located respectively at strain intensification areas 31-34, and also with strain gauges 41b, 42b, 43b, and 44b located respectively on the inner surface of the ring at the strain intensification areas 31-34.

The strain gauges used in the accelerometer of this invention are of the strain wire transducer type, of which many kinds are commercially available, although piezo resistive type gauges are also satisfactory. As is well known, the electrical resistance of a strain gauge element undergoes a change when there is a change in magnitude or direction of force applied to the element, as for example an increase in electrical resistance when the element is placed in tension and a decrease in electrical resistance when the element is placed in compression. Each of the gauge elements is therefore oriented with its conductors parallel to anticipated strain, and is provided with electrical leads which connect the element in a measuring circuit in which the resistance variations of the strain gauges can produce electrical variations indicative of the stresses to which they are subjected.

As shown in FIG. 3, the strain gauges in the accelerometer 10 are electrically connected in a bridge circuit in which the several strain gauges are represented schematically of resistances of corresponding reference number. In one arm of the bridge the strain gauge elements 41a and 41b located at one strain intensification area of the sensing ring are serially connected to the diametrically opposed strain gauge elements 43a and 43b. In like manner, strain gauge elements 42a and 42b are serially connected with strain gauge elements 44a and 44b in a second arm of the bridge. The remaining arms of the bridge are provided with balancing resistors 51, 52, respectively. For circuit operation, a direct current voltage from a voltage source 53 is applied across the bridge at the junctions 55 and 56 between the balancing resistors 51 and 52 and the resistors 43b and 44b, respectively.

In the absence of an angular acceleration or any other unsettling forces on the strain gauge elements, the bridge circuit is balanced by means of the adjustable resistors 51 and 52. For indicating the condition of bridge balance or imbalance, a null detector meter 57, preferably of the "zero-center" type, is connected across opposing corners of the bridge to the junctions 58 and 59.

By referring to FIG. 1 it will be noted that clockwise rotary acceleration of the angular accelerometer 10 will result in the strain gauges 43a and 43b being placed in tension, and the strain gauges 42a and 42b being placed in compression, due to inertia of the mass 21. Also, due to inertia of the mass 22, the strain gauges 41a and 41b are placed in tension, and the gauges 44a and 44b are subjected to compression forces. Since all of the strain gauges in one arm of the bridge are in tension, and all of the gauges in another arm of the bridge are in compression, the resistance ratios of the bridge arms are no longer equal, so that there is a resulting imbalance of the bridge circuit indicated by a voltage across the junctions 58 and 59. The magnitude of the voltage is proportional to the magnitude of the angular acceleration, and the direction of the angular acceleration is indicated by the polarity of voltage across the junctions 58 and 59.

It is readily apparent that the angular accelerometer 10 is operational with only use of the external strain gauges. However, the location of strain gauges on the inner surface of the sensing ring enhances the over-all accuracy and sensitivity of the device, since these gauges serve to cancel vibrations which might be induced in the sensing ring and any forces other than those yielding angular acceleration data. For example, an undesirable flexing of the sensing ring in the area of the strain gauges 44a and 44b would result in one of the gauges, either 44a or 44b, being placed in tension, and the other gauge being placed in compression. Consequently, the electrical effects on the gauges are nullified since the increase in electrical resistance of the gauge placed in tension is balanced by the decrease in electrical resistance of the gauge which is placed in compression, and there is an effective cancellation of the undesirable flexure.

An alternative form of bridge circuit for measuring angular acceleration is shown in FIG. 4. In this simpler form of circuit the serially connected strain gauge elements 41a and 41b associated with the strain intensification area 31 are placed in one arm of the bridge, and the gauges 42a and 42b at strain intensification area 32 are connected in series in a second arm. The third bridge arm comprises the strain gauges 44a and 44b, and the fourth arm comprises the strain gauges 43a and 43b. A direct current voltage from a voltage source 61 is applied across the bridge at the junctions 62 and 63. The condition of bridge balance or unbalance is indicated by a null meter 66 connected across the junctions 67 and 68 between the gauges 41b and 42a, and between the gauges 43a and 44b, respectively. The several strain gauges are carefully calibrated and adjusted to have identical resistances so that the bridge is normally in balance.

It will be noted that a clockwise rotary acceleration of the angular accelerometer 10 in FIG. 1 places the gauges 41a, 41b, and 43a, 43b in tension, and the gauges 42a, 42b and 44a, 44b in compression. Since there is a change in the resistance ratios of the bridge arms, there is a resulting imbalance of the bridge and a corresponding indication of acceleration. The direction of the acceleration is determined by the voltage polarity across the junctions 67 and 68 which is indicated by the direction of the meter deflection. A counterclockwise acceleration, of course, results in a similar imbalance of the bridge with a reversal of tension and compression forces resulting in a voltage polarity reversal.

By the arrangement shown in FIG. 1, it is to be noted that a linear acceleration of the accelerometer 10 will be effectively nullified by the nature of forces applied to the various strain gauges. For example, due to inertia of the masses 21 and 22, a linear acceleration of the accelerometer 10 is in the longitudinal direction of the support member 13 and to the right in the figure will result in compression of the gauges 42 and 41, respectively, and subjection of the gauges 43 and 44 to tension forces. The balance of the bridge circuit therefore remains undisturbed since the resistance ratio of the bridge arm containing the gauges 41a, 41b, and the arm containing the gauges 42a, 42b remains equal to the resistance ratio of the arm containing gauges 44a, 44b and the arm containing gauges 43a, 43b.

In like manner, a linear acceleration in the direction of the mass connecting rod 25 and to the right in FIG. 1 results in a compression of the gauges 41 and 44, and subjection of the gauges 42 and 43 to tension forces. It will therefore be readily seen with reference to FIGS. 4 or 5 that the measuring circuit balance remains undisturbed, and the linear accelerations are effectively nullified in the accelerometer.

An important feature of the accelerometer 10 is provision of the rigid aluminum rod 25 which is clamped at each end to the sensing ring. The presence of the rod tends to insure that any vibrations which are induced in the two halves of the ring opposite the supporting member 13 are in correspondence and identical, so that the electrical balance of the measuring bridge is undisturbed. It is also to be noted that by the novel arrangement wherein the strain gauges are mounted on an annular sensing ring, impedance matching of strain gauges and their symmetrical arrangement is made far simpler due to the simple geometry of the system.

It is to be understood, of course, that although the principal parts of the angular accelerometer of this invention are described as being fabricated of aluminum, with the exception of the steel disk masses, other metallic materials could be used in lieu thereof. Also, while the annular sensing ring of the accelerometer 10 is in the form of a circular cylinder, other annular shapes could be employed.

A modification of the invention using an alternative form of support means for the sensing ring is shown in FIG. 5. In this embodiment 10', the support is provided by a pair of L-shaped braces 81, 82, each of which is bolted to the base plate 17' and to the external surface of the sensing ring. The bolts 83 through the ring are held by fastening plates 84. This form of the invention is more susceptible to structural flexures than is the accelerometer 10 and presents problems in alignment of the graces and in avoiding pre-loading strains in the sensing ring. However, by eliminating the diametrically disposed supporting member for the ring 11' permits a reduction in weight of the device and has particular application where weight is especially critical. It also permits use of a more rigid connecting rod 25' between the masses 21' and 22' than can normally be used with the accelerometer 10.

The sensitivity of the device is a function of several variables such as the radius of the annular sensing ring, the size of the masses, and the size of the strain intensification areas. The sensitivity is also readily adjustable by replacement of the masses on the annular ring with masses of a different size. In this respect an annular sensing ring of smaller radius would require the use of larger masses to maintain a comparable sensitivity. Furthermore, while it would be possible to reduce the width of the annular sensing ring, that is, the dimension parallel to the cylindrical axis, this would render the device more susceptible to vibrations and flexures in this direction, so that the provision of strain intensification areas as in the accelerometer 10 is to be preferred.

The unique structure of the angular accelerometer of this invention provides a very sturdy and reliable device which exhibits a very precise high and low frequency response and one which is insensitive to constant angular velocity. It would be possible, of course, to modify the structure described herein as by the use of strain gauges other than the bonded strain wire resistance type, for example, piezo resistive gauges. It would also be possible to fabricate the accelerometer of this invention by using two separate semicircle shapes with aligned centers of curvature for supporting the masses in lieu of the annular sensing ring. However, the feature that all of the strain gauges are mounted on the same sensing ring provides for accurate temperature compensation since heat conduction in the sensing ring insures that all of the gauges are of uniform temperature. Temperature compensation, of course, is not so reliable in a device in which the strain gauges are mounted on separate structures and the problem of structural flexures would also be more critical.

It should also be understood that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. An apparatus for measuring angular acceleration, said apparatus comprising:
   a ring member;
   support means for supporting said ring member at diametrically opposed points on said ring member, said support means being rigidly connectable to a body adapted to be subject to angular acceleration;
   a pair of masses supported on said ring member and mounted thereon at diametrically opposed locations which are equiangularly disposed relative to said support points;
   a rigid memer interconnecting said masses;
   a plurality of stress sensing means mounted on said ring member for sensing strains induced in said ring member by inertia of said masses when said apparatus is subjected to angular acceleration, at least one of said stress sensing means being located between each said mass and support point; and
   indicating means responsive to said plurality of stress sensing means for indicating magnitude and direction of angular acceleration of said apparatus.

2. An apparatus for measuring angular acceleration as described in claim 1 wherein said stress sensing means comprise electrical resistance type strain gauge elements, which are bonded to the wall of said ring and characteristically change electrical resistance when subjected to deforming forces, and said indicating means is an electrical circuit means electrically interconnecting each said strain gauge element and responsive to changes in electrical resistance of the strain gauge elements produced by tension and compression forces in said ring member for indicating the magnitude and direction of angular acceleration.

3. An apparatus for measuring angular acceleration, as described in claim 2, further characterized in that said ring member is provided with a plurality of strain intensification regions, each produced by a reduction in cross-sectional area of said ring member; at least one of said strain intensification regions being located between each said mass and support point, and at least one of said strain gauge elements being bonded to the wall of said ring member at each said strain intensification region.

4. An apparatus for measuring angular acceleration, said apparatus comprising:
   a ring member;
   support means for supporting said ring member at diametrically opposed points on said ring member, said support means being rigidly connectable to a body adapted to be subject to angular acceleration;
   a pair of masses supported on said ring member and mounted thereon at diametrically opposed locations which are equiangularly disposed relative to said support points;
   a plurality of stress sensing means mounted on said ring member for sensing strains induced in said ring member by inertia of said masses when said apparatus is subjected to angular acceleration and wherein at least one of said stress sensing means is located between each said mass and support point; and
   indicating means responsive to said plurality of stress sensing means for indicating magnitude and direction of angular acceleration of said apparatus.

5. An apparatus for measuring angular acceleration as described in claim 4 wherein said stress sensing means comprise electrical resistance type strain gauge elements, which are bonded to the wall of said ring and characteristically change electrical resistance when subjected to deforming forces, and said indicating means is an electrical circuit means electrically interconnecting each said strain gauge element and responsive to changes in electrical resistance of the strain gauge elements produced by tension and compression forces in said ring member to indicate magnitude and direction of angular acceleration.

6. An apparatus for measuring angular acceleration as described in claim 5 wherein said electrical circuit means comprises a Wheatstone bridge arrangement of the strain gauge elements, said bridge being normally in a balanced condition but becoming unbalanced when the apparatus is subjected to angular acceleration.

7. An apparatus for measuring angular acceleration, as described in claim 2, further characterized in that said ring member is provided with a plurality of strain intensification regions, each produced by a reduction in cross-sectional area of said ring member; at least one of said strain intensification regions being located between each said mass and support point, and at least one of said strain gauge elements being bonded to the wall of said ring member at each said strain intensification region.

8. An apparatus for measuring angular acceleration, said apparatus comprising:
 a ring member;
 support means for supporting said ring member at diametrically opposed points on said ring member, said support means being rigidly connectable to a body adapted to be subject to angular acceleration;
 a pair of masses supported on said ring member and mounted thereon at diametrically opposed locations which are disposed by ninety degrees relative to said support points, said ring member having a plurality of strain intensification regions, each produced by a reduction in cross-sectional area of said ring member and at least one of said strain intensification regions being located between each said mass and support point;
 a rigid member interconnecting said masses;
 a plurality of strain gauge elements mounted on said ring member for sensing strains induced in said ring member by inertia of said masses when said apparatus is subjected to angular acceleration, a pair of said strain gauge elements being located at each strain intensification region with one of said pair being bonded to the innermost surface of said ring member and the other of said pair being bonded to the outermost surface of said ring member; and
 electrical circuit means electrically interconnecting each said strain gauge element and responsive to changes in electrical resistance of the strain gauge elements for indicating the direction and magnitude of angular acceleration, each said pair of gauge elements forming one arm of a bridge circuit.

No references cited.

RICHARD C. QUEISSER, *Primary Examiner.*